S. E. BEELER.
MOTOR DRIVEN LAWN MOWER.
APPLICATION FILED DEC. 29, 1914.

1,156,520.

Patented Oct. 12, 1915.
4 SHEETS—SHEET 1.

Witnesses

Inventor
Samuel Edward Beeler
By Bradford & Doolittle,
Attorneys

S. E. BEELER.
MOTOR DRIVEN LAWN MOWER.
APPLICATION FILED DEC. 29, 1914.

1,156,520.

Patented Oct. 12, 1915.
4 SHEETS—SHEET 4.

UNITED STATES PATENT OFFICE.

SAMUEL EDWARD BEELER, OF WAYNESBORO, PENNSYLVANIA.

MOTOR-DRIVEN LAWN-MOWER.

1,156,520.

Specification of Letters Patent.  Patented Oct. 12, 1915.

Application filed December 29, 1914. Serial No. 879,561.

*To all whom it may concern:*

Be it known that I, SAMUEL EDWARD BEELER, a citizen of the United States, residing at Waynesboro, Franklin county, and State of Pennsylvania, have invented and discovered certain new and useful Improvements in Motor-Driven Lawn-Mowers, of which the following is a specification.

My said invention consists in various improvements in the details of construction and arrangement of parts of motor driven lawn movers of that type wherein the cutting mechanism and the traction mechanism are capable of being driven independently from the same motor, whereby various advantages are secured in the operation and results, all as will be hereinafter more fully described and claimed.

Figure 1:
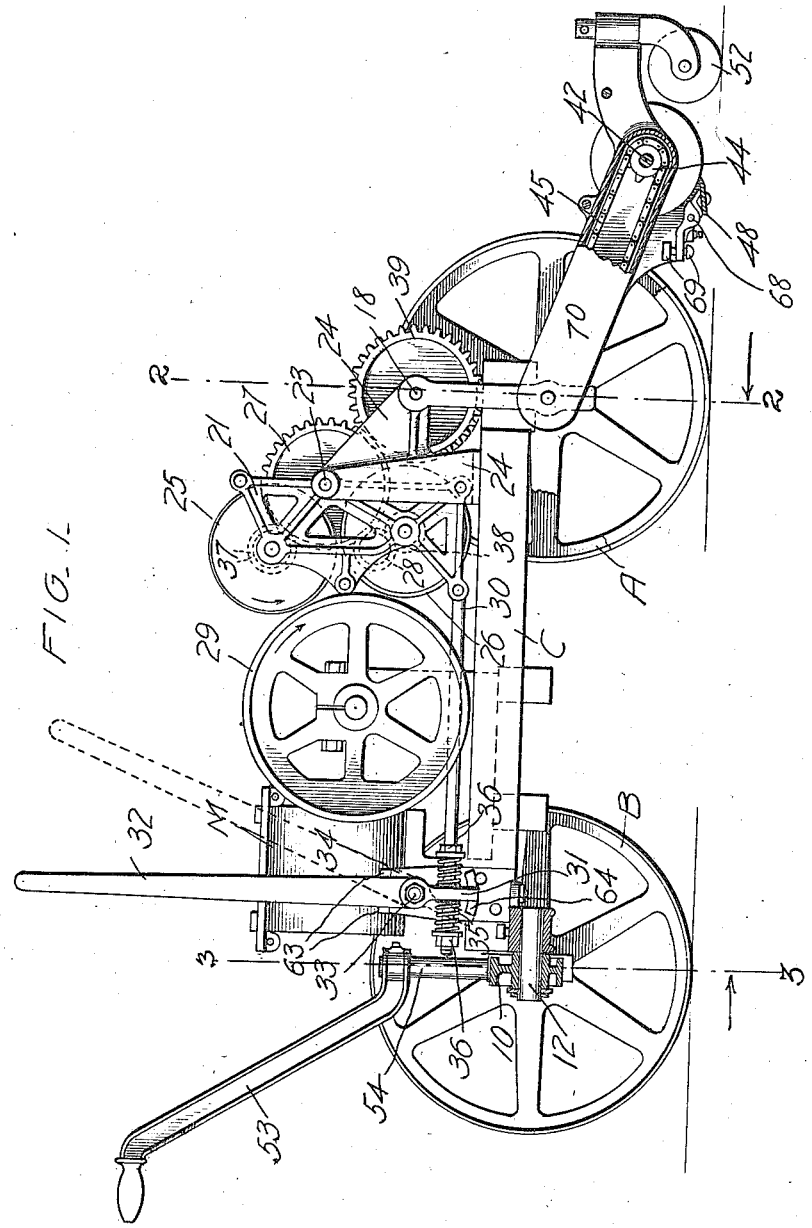
Figure 2:
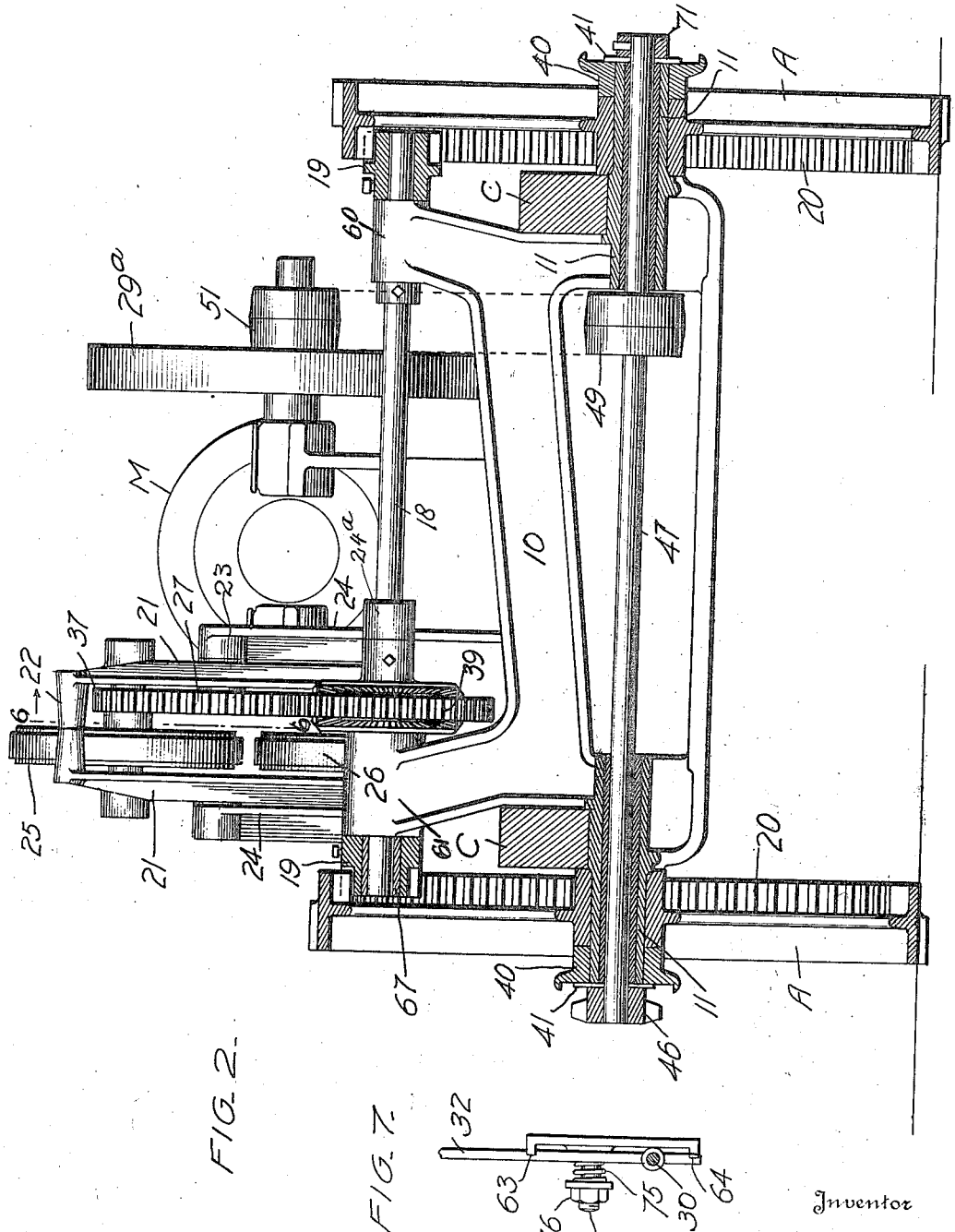
Figure 3:
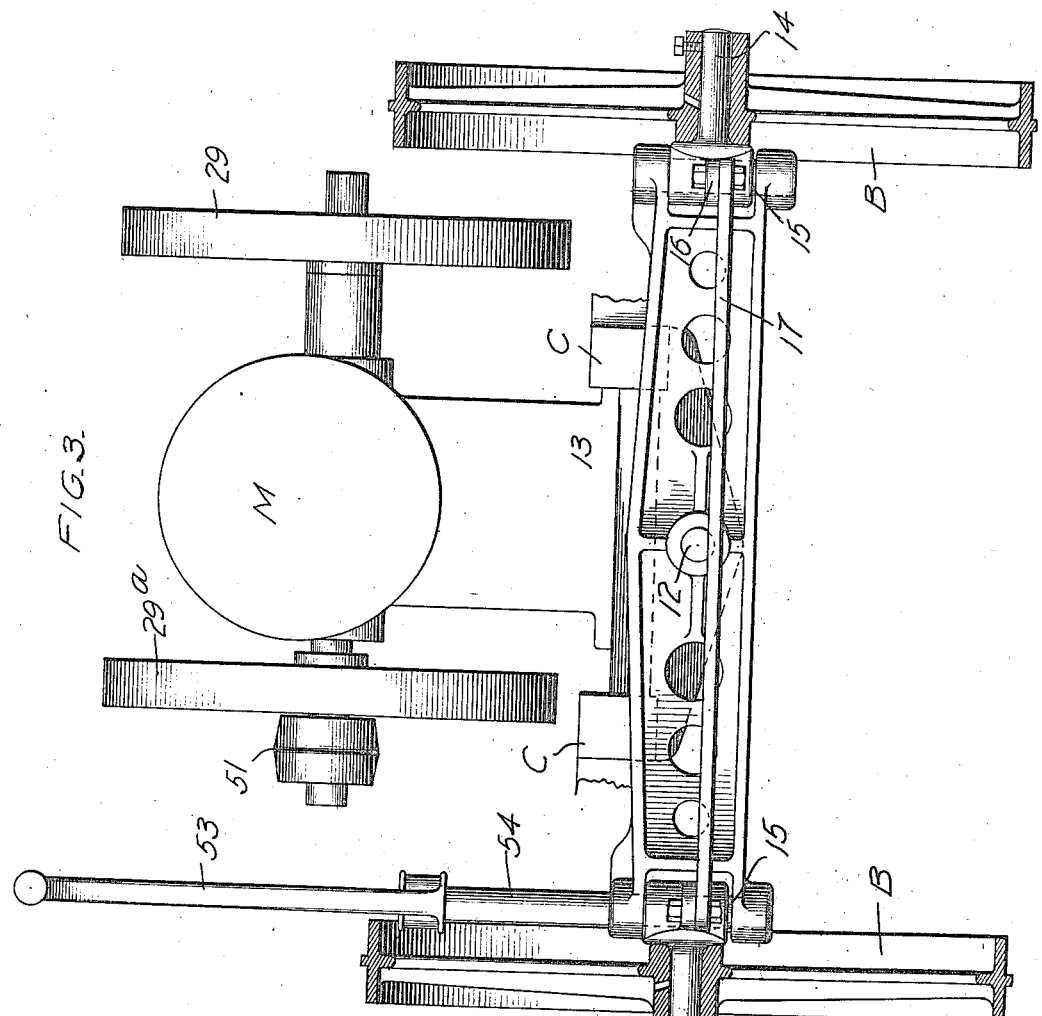
Figure 4:
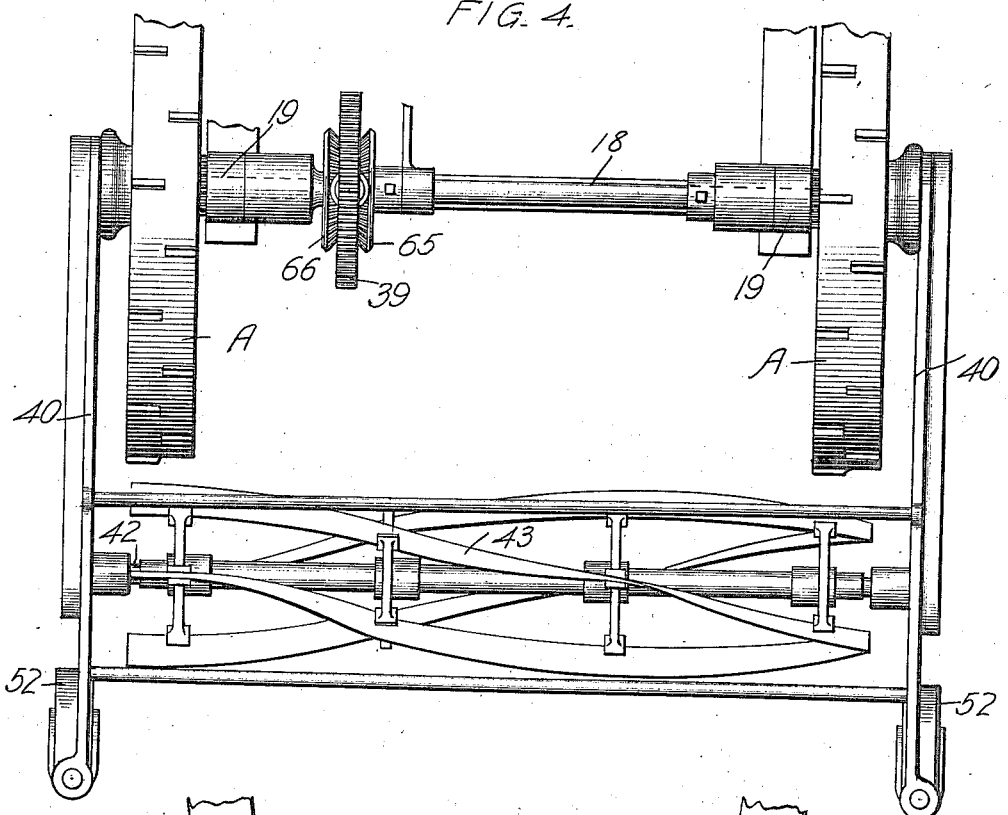
Figure 5:
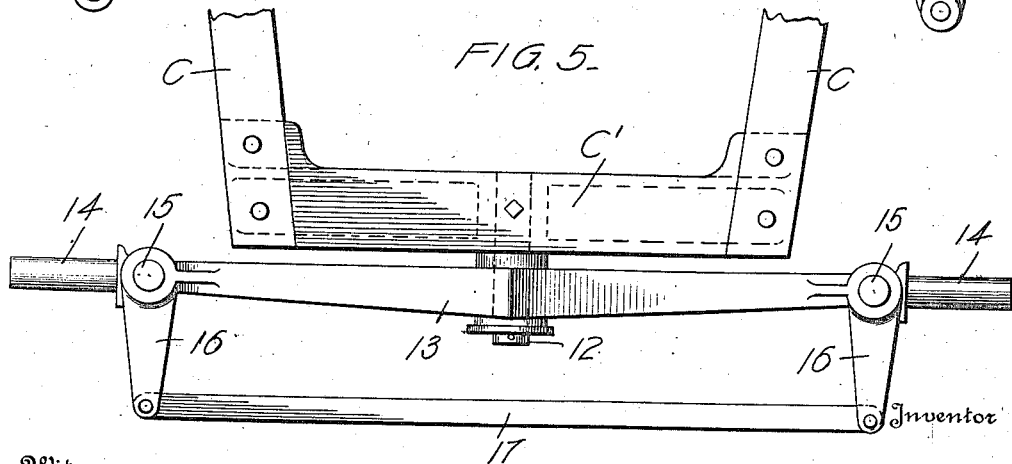

Referring to the accompanying drawings which are made a part hereof, and on which similar reference characters indicate similar parts, Figure 1 is a side elevation, certain details being shown in section, of a motor driven lawn mower of my improved construction, Fig. 2 a view partly in front elevation and partly in section, as on the dotted line 2—2 in Fig. 1, Fig. 3 a view partly in rear elevation and partly in cross section as on the dotted line 3—3 in Fig. 1, Fig. 4 a detail top plan of the front end of the machine, or cutting apparatus, Fig. 5 a detail top plan of the rear or steering axle, Fig. 6 a detail sectional view on the dotted line 6—6, of Fig. 1, showing the transmission gear, the friction wheels being indicated by dotted lines, and Fig. 7 a detail view showing the lower end of lever 32 (Fig. 1), and the associated connections, in edge elevation.

In said drawings the portions marked A represent the traction wheels, B the steering wheels, C the supporting frame, and M the motor.

The traction wheels A are of a type similar to those used on a traction engine, with projecting transverse ribs on their peripheries.

The wheels B are preferably of substantially the same diameter as the traction wheels A, and have circumferential ribs formed thereon.

The frame C is composed of side bars, or sills, supported at the front end on suitable parts of a transverse bracket 10 which is formed with hollow spindles 11 on each end on which the traction wheels A are mounted. The rear end of said sills C are connected by a cross end member C¹, which is supported by a horizontal central pivot 12 connected to the rear axle 13. Said rear axle 13 is of common type, such as used in traction engines and automobiles, and has spindles 14 pivoted to each end thereof on vertical pivots or shafts 15. Said spindles are formed with right-angle arms 16, the outer ends of which are connected by a rod 17. The wheels B are mounted on said spindles 14.

The motor M may be an internal combustion engine, or any other type of motor found desirable. It is supported on the frame C to which it is attached by bolts, or in any other appropriate manner.

The bracket 10 has bearings 60 and 61 at its upper ends in which is journaled a countershaft 18, for a purpose to be presently described.

A transmission gear cage 21, consisting of two substantially duplicate castings bolted together and held a distance apart by cross members 22, is pivoted on journals 23 in a bracket or housing 24 mounted on frame C. Said housing has forwardly projecting arms 24ª with bearings on countershaft 18, to insure proper distance between gear centers, as will be readily understood. Said cage contains bearings for the journals of friction gears 25 and 26 and for the intermediate gear 27. An intermediate pinion 28 is also journaled in appropriate bearings in said cage. The friction gears 25 and 26 are in line with and in close proximity to one of the fly wheels 29 of the motor and are adapted to be driven thereby. Said cage 21 is connected by a rod 30 to the lower end 31 of a lever 32 pivoted at 33 on a standard 34 secured to the side of a sill of frame C. Said rod extends through a perforation in the end 31 of said lever 32 and stiff coiled springs 35 are interposed between nuts or collars 36 on the rod and the opposite sides of said end 31 and serve to cushion the frictional contact.

Short lugs 63 are formed on the upper end of post 34 between which the lever 32 is adapted to rest and be held with the transmission cage 21 in position of "no" drive. A lug 64 is also formed on the lower side of said post against the rear side of which the lower end 31 of said lever may rest when set to drive in a forward direction. Lug 64 is tapered from a thin rear end to a thicker front end and a spring 75 is interposed between nut 76 on pivot 33 and the side of lever 32. By this means when lever 32 is pulled back to reverse the drive it is held free from lugs 63 and as soon as released the drive will be reversed immediately upon release of lever 32 through the medium of the springs 35, and thus insure against accidents to the operator by undue prolonging the backing operation.

A pinion 37 on the shaft of friction gear 25 meshes with the intermediate gear 27 and a small pinion 38 on the shaft of friction gear 26 meshes with intermediate pinion 28. Said gears 37, 27, 38, and 28 are all in mesh and friction gears 25 and 26 are adapted to interchangeably engage and be driven by frictional contact with fly wheel 29. Said intermediate gear 27 meshes with compensating gear 39 on countershaft 18. Said gear 39 drives gear 65 which is fast on shaft 18 in one side, and gear 66 on the other side. Said shaft 18 carries one of the pinions 19 which engages with the gear teeth 20 of one of the traction wheels A, and said gear 66 has a long hub, or sleeve 67, which extends through the bearing in bracket 10 and carries the other pinion 19 on its outer end which meshes with the teeth 20 on the other traction wheel A. Said gearing is thus adapted to transmit motion from the fly wheel of the motor to the traction wheels 20, to propel the machine over the ground.

The operation of the traction transmission will be readily understood from the foregoing description. The friction gear 26 may be termed the "forward drive friction" and the friction wheel 25 the "backward drive friction," and through the manipulation of the lever 32 by the operator, by means of the gearing described, the machine may be driven in either direction at will, or the transmission cage may be set at neutral, or no drive position, and the machine allowed to stand still. The speed may be regulated by adjusting the frictional contact, as is usual in friction drives. The machine is guided by means of a lever 53 on a steering post 54 which is preferably a continuation of one of the pivots 15 of a spindle 14 of the forward axle 13, said pivot and post being secured to or in piece with said spindle, whereby as said lever is turned the rear wheels are turned to guide the machine as desired. Both of the pivots 15 may be extended and each be provided with a steering lever 53, if preferred.

The cutting mechanism is carried on a frame consisting of arms 40 mounted on the outer ends of the sleeves, or hollow journals 11, of the bracket 10, just outside and adjacent to the hubs of the traction wheels A, being secured in position by washers 41, with the sprocket 46 on one end and collar 71 on the other. The forward ends of said bars are provided with bearings in which a transverse shaft 42 is mounted. The cutter reel 43 is mounted on said shaft 42 to rotate therewith. A sprocket wheel 44 is secured on one end of shaft 42 and connected by a sprocket chain 45 with a sprocket wheel 46 on one end of the cutter reel drive shaft 47 which is journaled within the hollow bearings or sleeves 11 of the bracket 10, and within the axis of the traction wheels A, and extends to outside said sleeve. The other end has a collar 71 secured thereon by which it is retained in place. The bed knife 48 is mounted on supporting brackets pivoted at 68 and provided with adjusting screws 69, whereby the knife may be adjusted toward or from the mean periphery of the cutter reel. The sprocket chain 45 is preferably inclosed in a casing or guard 70, as is usual. The forward end of the frame supporting the cutting mechanism is carried upon pilot wheels 52 swiveled in suitable supports. The cutter reel drive shaft 47 is provided with a pulley 49 adapted to be connected by a belt (indicated by dotted lines in Fig. 2) with a similar pulley 51 alongside the fly wheel 29ª on the engine shaft. The belt drive permits slipping, or throwing of the belt when the cutter meets an obstacle and avoids breakage. By this means the cutter reel is driven and entirely independent of the traction drive which may be stopped, reversed or slowed down without changing the drive of the cutter reel.

It will be understood that the mechanism above described may be modified in various details without materially modifying the operation of the machine and that such modifications are within the spirit of my invention. For example, the gears within the rims of the traction wheels A may be made in piece with said wheels, or as separate parts secured thereto. The steering mechanism may consist of a single steering lever 53, connected as described, or two levers, or other well known mechanical equivalents for such mechanism. The motor may be of any appropriate type and operated by any appropriate power generating medium.

Having thus fully described my said invention what I claim as new, and desire to secure by Letters Patent is:—

1. In a power driven mower the combination of a frame, traction and steering wheels supporting the frame, gear wheels journaled on the frame and connected to drive the traction wheels, a cage swingingly mounted on the frame, a transmission gearing journaled in said cage and having driving connection with said gear wheels, a motor mounted on the frame and adapted to have two independent driving connections with said transmission gearing, means for swinging the cage to effect either of said driving connections, and a cutter mechanism having independent driving connection with the motor, substantially as set forth.

2. In a power driven mower the combination of a frame, traction and steering wheels supporting the frame, gear wheels journaled on the frame and connected to drive the traction wheels, a swinging cage fulcrumed co-axially with one of said gear wheels, a transmission gearing journaled in said cage and having constant driving connection with one of said gear wheels, a motor mounted on the frame and adapted to have two independent driving connections with said transmission gearing, means for swinging the cage to effect either of said motor driving connections, and a cutter mechanism having independent driving connection with the motor, substantially as set forth.

3. In a power driven mower the combination of a frame, traction and steering wheels supporting the frame, a bracket mounted on the frame, a gear wheel journaled on the bracket and connected to drive the traction wheels, a cage fulcrumed on the bracket co-axially with said gear wheel, a transmission gearing journaled in said cage and having constant driving connection with said bracket gear wheel, a motor mounted on the frame and adapted to have two independent driving connections with said transmission gearing, means for swinging the cage to effect either or neither of said motor driving connections, and a cutter mechanism having independent driving connection with the motor, substantially as set forth.

4. In a power driven mower the combination of a frame, traction and steering wheels supporting the frame, a bracket mounted on the frame, a gear wheel journaled on the bracket and connected to drive the traction wheels, a cage fulcrumed on the bracket co-axially with said gear wheel, a transmission gearing journaled in said cage comprising a pair of friction gear wheels and having constant driving connection with said bracket gear wheel, a motor mounted on the frame and adapted to having driving engagement with either or neither of said friction gear wheels, a lever fulcrumed on the frame and connected to actuate the cage, and a cutter mechanism having independent driving connection with the motor, substantially as set forth.

5. In a power driven mower the combination of a frame, traction and steering wheels supporting the frame, a shaft journaled in the frame and having pinions in driving engagement with said traction wheels, a compensating gear mounted on said shaft, a bracket mounted on the frame, a pinion journaled on said bracket and meshing with said compensating gear, a cage fulcrumed on the bracket, a transmission gearing comprising a pair of friction gears journaled in the cage and having constant engagement with said bracket pinion, a motor mounted on the frame and adapted to have driving engagement with either or neither of said friction gears, means for actuating the cage to effect neutral or driving connection with the motor, and a cutter mechanism having independent driving connection with the motor, substantially as set forth.

6. In a power driven mower the combination of a frame, traction and steering wheels supporting the frame, gear wheels journaled on the frame and connected to drive the traction wheels, a cage swingingly mounted on the frame, a transmission gearing comprising two friction gears journaled in said cage and having driving connection with said gear wheels, a motor mounted on the frame and adapted to have driving engagement with either of said friction gears, a lever fulcrumed on the frame, a rod connecting said lever and the swinging cage, devices associated with said lever for holding either or neither of said friction gears in driving connection with the motor, and a cutter mechanism having independent driving connection with the motor, substantially as set forth.

7. In a power driven mower the combination of a frame, traction and steering wheels supporting the frame, a motor mounted on the frame, a gearing train mounted on the frame operable for driving the traction wheels in either direction from the motor and comprising a transmission gearing journaled in a swinging cage, a lever fulcrumed on the frame, a rod connecting the lever with said cage, springs carried by the rod engaging with the lever on either side thereof and providing a resilient connection therebetween, and lugs on the frame for holding the lever in neutral and operative positions, substantially as set forth.

In witness whereof, I have hereunto set my hand and seal at Washington, District of Columbia, this fifth day of December, A. D. nineteen hundred and fourteen.

SAMUEL EDWARD BEELER. [L. S.]

Witnesses:
E. W. BRADFORD,
E. G. CLEMENTS.